United States Patent [19]

Tsukada

[11] 4,445,126
[45] Apr. 24, 1984

[54] IMAGE FORMING APPARATUS

[75] Inventor: Masaharu Tsukada, Kawasaki, Japan

[73] Assignee: Canon Kabushiki Kaisha, Tokyo, Japan

[21] Appl. No.: 336,851

[22] Filed: Jan. 4, 1982

[30] Foreign Application Priority Data

Jan. 12, 1981 [JP] Japan ................... 56-2144

[51] Int. Cl.³ .............................................. G01D 9/42
[52] U.S. Cl. ................................... 346/108; 346/160; 358/285; 350/6.5
[58] Field of Search ................. 346/108, 762, 74, 160; 350/6.5, 6.7, 6.8; 354/5; 358/285

[56] References Cited

U.S. PATENT DOCUMENTS

| 3,520,586 | 7/1970 | Bousky | 350/6.7 |
| 3,635,545 | 1/1972 | Von Kerkhove et al. | 346/108 X |
| 3,734,609 | 5/1973 | Tonaka et al. | 355/8 X |
| 4,089,008 | 5/1978 | Suga et al. | 346/108 X |
| 4,097,115 | 6/1978 | Garwin et al. | 350/6.7 |
| 4,253,102 | 2/1981 | Kataoka et al. | 346/108 |

Primary Examiner—E. A. Goldberg
Assistant Examiner—Derek Jennings
Attorney, Agent, or Firm—Fitzpatrick, Cella, Harper & Scinto

[57] ABSTRACT

An image forming apparatus in which a recording medium is scanned with plural light beams. The apparatus includes a beam generator for generating plural light beams, a scanner for scanning with the light beams, and an optical system for reducing the distance between the plural light beams on the recording medium.

21 Claims, 11 Drawing Figures

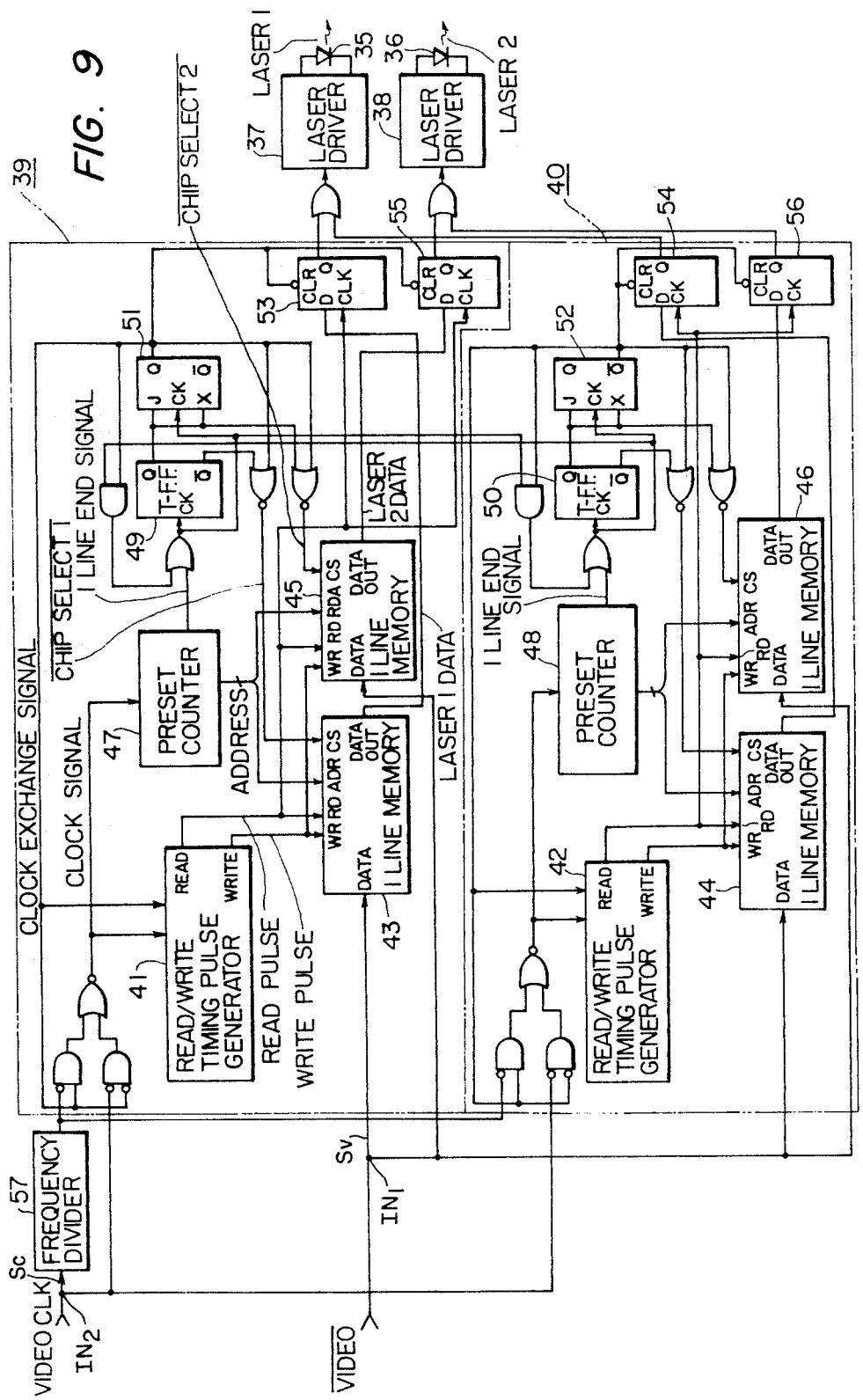

IMAGE FORMING APPARATUS

BACKGROUND OF THE INVENTION

1. Field of the Invention

The present invention relates to an image forming apparatus, and, more particularly, to an image forming apparatus for image formation by scanning a recording medium with a light beam such as a laser beam modulated with pixel signals.

2. Description of the Prior Art

As disclosed in the U.S. Pat. No. 4,233,612, there are already proposed various image forming apparatus for the formation of images, such as characters or graphics, by scanning a recording medium, such as an electrophotographic photosensitive member, with a light beam, such as a laser beam, modulated in response to information signals.

In such an image forming apparatus, there is proposed a multi-beam scanning method utilizing plural light beams in order to achieve a high-speed scanning.

In case of a high-powered light beam source, such as a gas laser, it is possible to form plural beams from a single beam by means, for example, of an acousto-optical modulating element and to modulate in order of their formation the formed plural beams for scanning. Such a method, however, is not suitable for a compact image forming apparatus since it not only requires the large-sized light beam source and the additional devices such as the acousto-optical modulating element, but involves a large complicated scanning mechanism.

On the other hand, there are known small light beam sources, such as semiconductor lasers, which can control the light beam in response to the information signals without additional devices, such as the acousto-optical converting element, and can, therefore, be utilized in the compactization of the apparatus.

However in a semiconductor laser device capable of generating plural beams, the light emitting points are at least mutually distanced, approximately by 100 microns, so that the scanning beams are inevitably spaced by 1 to 3 millimeters on the recording medium if an ordinary optical scanning system is employed. Since ordinary image recording requires at least 6 or preferably 8 scanning lines of light beam per millimeter, the multiple beam scanning with such a beam source will require complete control. More specifically, in a scanning cycle with simultaneously running plural beams, while a first light beam is modulated according to the information of first line of an original document, a second light beam has to be modulated according to the information of a line which is several lines ahead of the second line of the original document. In the subsequent scanning cycle, while said first beam is modulated according to the information of the second line, said second beam has to be modulated according to the information of a line further ahead.

Consequently, the control unit for the multiple beam scanning requires sufficient memory means for storing a large amount of information to be recorded and means for controlling complicated data readout from said memory means according to the line to be scanned.

In order to avoid the above-mentioned difficulty, the U.S. Pat. No. 4,253,102 discloses a method in which the light-sources are not perpendicularly arranged, but are obliquely arranged with respect to the principal scanning direction. In such a method, however, a complicated control for synchronization is inevitable as the light beams have different start timings.

SUMMARY OF THE INVENTION

The object of the present invention is to provide a novel image forming apparatus.

Another object of the present invention is to provide an improvement in an image forming apparatus in which a recording medium is scanned with plural laser beams generated by a multi-beam laser device and modulated according to the pixel signals in order to increase the recording speed.

Still another object of the present invention is to provide a scanning method and an apparatus therefor capable of irradiating a recording medium with plural laser beams concentrated with a simple means, thereby increasing the density of scanning lines on the recording medium.

The above-mentioned objects can be attained in the present invention by an image forming apparatus for scanning a recording medium with plural light beams, comprising, means for generating plural light beams, means for scanning with said plural light beams, and optical means for reducing the distance between the plural light beams on the recording medium, whereby a high-speed image formation is rendered possible through a simple control.

Still other objects and advantages of the present invention will be made apparent from the following description of the preferred embodiments.

BRIEF DESCRIPTION OF THE DRAWINGS

FIG. 9 is a block diagram of the control circuit for the scanning unit employed in the apparatus of FIG. 7.

DESCRIPTION OF THE PREFERRED EMBODIMENTS

Figure 1:
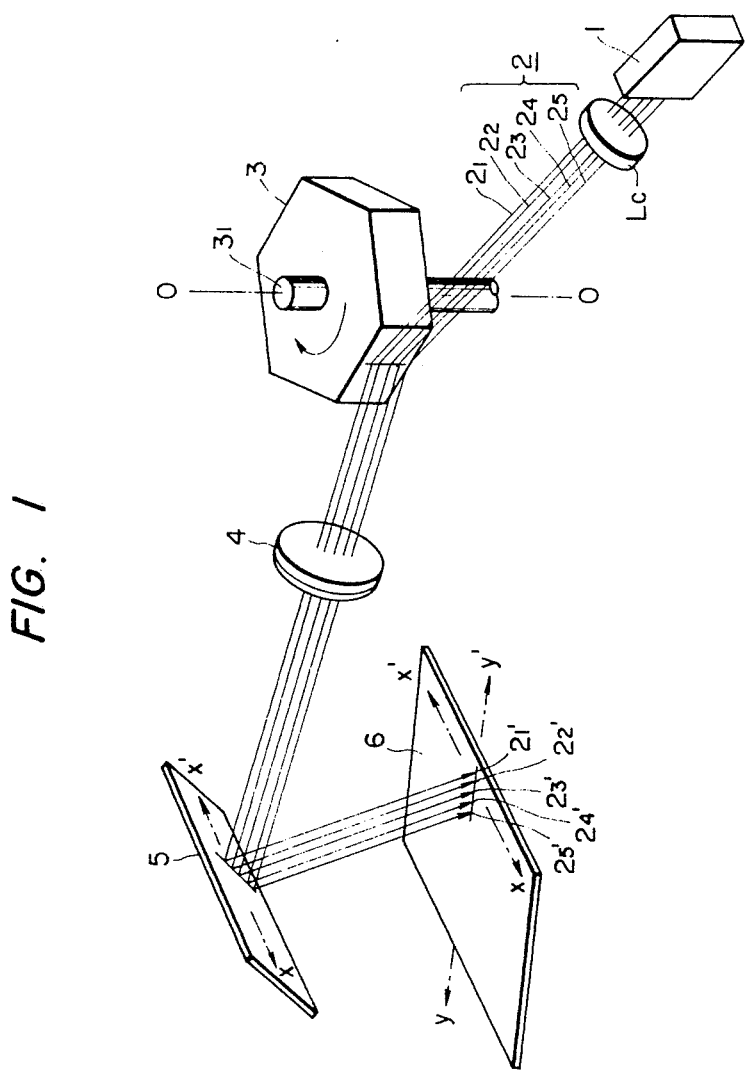
FIG. 1 is a schematic view of a multiple beam scanning method embodying the present invention.

FIG. 1 is a schematic view of a scanning system for a multibeam laser printer, wherein a multi-beam laser device 1 emits, toward a polygonal mirror 3 rotated at a high speed in a direction of arrow about a shaft $3_1$, plural parallel laser beams (five beams $2_1$-$2_5$ being shown in the illustration) which are modulated as pixel signals in response to either time-sequential signals from an unrepresented image reading mechanism or image information signals transmitted through a facsimile system. Each diverging beam from said laser device is converted into a parallel beam through a collimating lens $L_c$.

Said beams $2_1$–$2_5$ are reflected by said polygonal mirror 3 and guided to a recording medium 6 through an f-$\theta$ lens 4 and a mirror 5. The rotation of the polygonal mirror 3 sets the beams $2_1$–$2_5$ in a sweeping motion in a direction x—x' on the mirror 5, thereby causing beam spots $2_1'$–$2_5'$ to displace in the direction x—x' on the recording medium 6. In this manner the principal scanning on the recording medium 6 is achieved by the displacement of the beam spots $2_1'$–$2_5'$ in said direction x—x'. The f-$\theta$ lens performs a correcting function in such a manner that each beam spot shows a constant scanning speed in the principal scanning direction x—x'. In the illustrated example, said f-$\theta$ lens is a so-called telecentric lens having an infinitely distance exit pupil for obtaining mutually parallel emerging beams. Said recording medium 6 is displaced at a constant speed for achieving auxiliary scanning in a direction y—y' perpendicular to the above-mentioned direction x—x'.

Said recording medium 6 can be composed, for example, of a photoconductive member used in an electro-photographic process, an opto-magnetic converting member used in a magnetic recording process or a photosensitive member comprising a chemical photosensitive emulsion, and it can be of a shape, other than the illustrated sheet form, such as a drum, an endless belt or a web.

In the above-mentioned manner, the entire surface of the recording medium 6 is scanned with beams by the displacement of the beams in the principal scanning direction x—x' and by the displacement of said medium in the auxiliary scanning direction y—y' to form an electrostatic, magnetic or chemical latent image, or to form directly a visible image on said recording medium 6, corresponding to the scanning beam signals. Such a latent or visible image is subjected to the steps of development, transfer, fixing, etc. according to the principle of each imaging process thereby providing a permanent image.

Figure 2A:
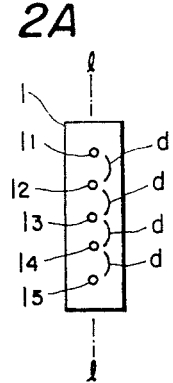
FIG. 2A is a schematic view showing the arrangement of multiple light beam sources.
Figure 2B:
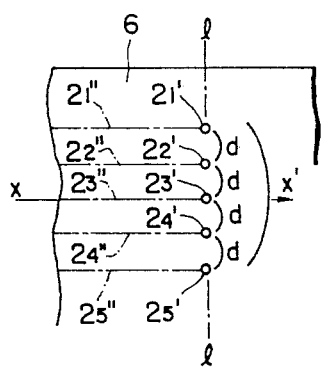
FIG. 2B is a schematic view showing the state of scanning with multiple light beams on a recording medium in a conventional scanning method.

FIG. 2A shows a beam exit face of the multibeam laser device 1, in which light-emitting points $1_1$–$1_5$ for the beams $2_1$–$2_5$ are arranged with a pitch d and along a line 1—1 parallel to the rotary axis O—O of the rotary polygonal mirror 3, whereby the spots $2_1'$–$2_5'$ of the beams $2_1$–$2_5$ on the recording medium 6 are arranged with a mutual distance d and along a direction perpendicular to the principal scanning direction x—x', as shown in FIG. 2B.

However the distance d of the scanning lines $2_1'$–$2_5'$ has to be made as small as possible in order to obtain an image of a satisfactory quality, i.e. with a high image resolution. It is, therefore, desirable to reduce the distance d of the beam emitting points $1_1$–$1_5$ on the beam exit face of the multi-beam laser device 1, but said distance is presently limited to the order of 100 microns due to the manufacturing technology involved.

Figure 3A:
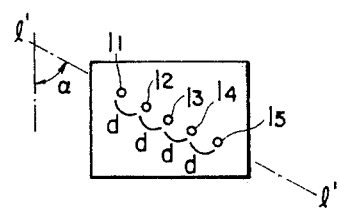
FIGS. 3A and 3B are schematic views showing an improved method for reducing the distance of scanning lines.

As a simple method for overcoming this limitation, there is proposed a method of arranging the light emitting points $1_1$–$1_5$ on the beam exit face of the multi-beam laser device 1 with a pitch d and along a line 1'—1' oblique to the rotary axis O—O of the polygonal mirror 3 as shown in FIG. 3A.

Figure 3B:
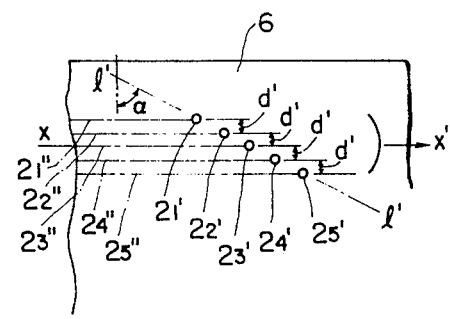

In this case, the recording medium 6 is scanned with beam spots $2_1'$–$2_5'$ arranged in an oblique angle with respect to the principal scanning direction x—x' as shown in FIG. 3B, corresponding to the above-mentioned oblique arrangement of the light-emitting points $1_1$–$1_5$. Consequently, the pitch d' of the scanning lines $2_1''$–$2_5''$ is equal to d x cos $\alpha$, $\alpha$ being the angle between the line 1'—1' and the vertical line, and is considerably reduced from the actual pitch of said light-emitting points. In this manner, it is possible to reduce the pitch d of the scanning lines $2_1''$–$2_5''$ on the recording medium 6 by selecting a large value for the angle $\alpha$ even if the pitch d is relatively large.

However, in such a scanning method with obliquely arranged beam spots, the beam spots $2_1'$–$2_5'$ on the recording medium 6 are increasingly spaced apart in the principal scanning direction x—x' with the increasing of the angle $\alpha$, thus causing aberrations in the scanning time. For this reason it has been necessary to provide a correction in the hardware or software in order to compensate for such aberrations.

The above-mentioned drawbacks are resolved by the present invention, in which the light-emitting points $1_1$–$1_5$ on the beam exit face of the multi-beam laser device 1 are arranged along a line 1—1 parallel to the rotary axis O—O of the polygonal mirror 3 as shown in FIGS. 2A and 2B, but the beams $2_1$–$2_5$, even if mutually separated by a relatively large distance d, are concentrated by simple optical means on the recording medium 6 to obtain a high-quality image with an increased density of the scanning lines.

Figure 4:
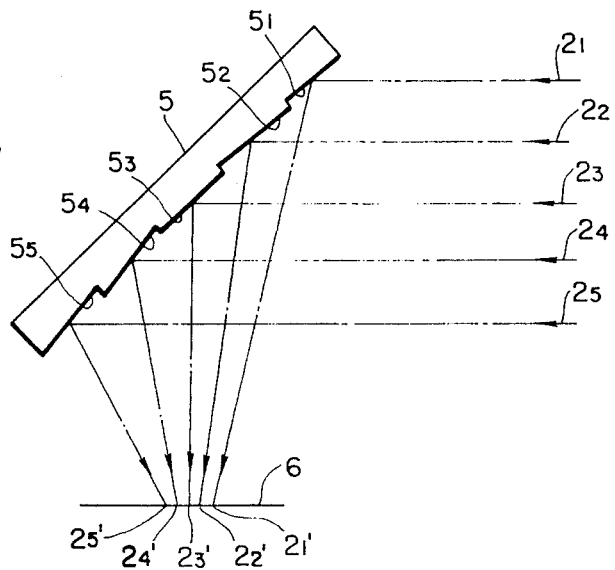
FIGS. 4, 5 and 6 are schematic views showing different embodiments of reflector means in the scanning method of the present invention.

According to the present invention, the mirror 5 shown in FIG. 1 is provided with mirror faces $5_1$–$5_5$ for receiving the laser beams. The mirror faces are angled so as to direct the reflected laser beams $2_1$–$2_5$ toward the recording medium 6 with an increased density thereon, as shown in FIG. 4.

In this manner the laser beams $2_1$–$2_5$ can be concentrated on the recording medium 6 by selecting appropriate angles for said mirror faces $5_1$–$5_5$ even if the light-emitting points $1_1$–$1_5$ on the beam exit face of the multi-beam laser device 1 are mutually separated by a relatively large distance d. Thus, the recording medium 6 is scanned with an increased density of the scanning beams $2_1$–$2_5$ to provide an improved image resolution.

Also, in case the laser beams $2_1$–$2_5$ from the multi-beam laser device 1 are not evenly distanced, i.e. mutually separated, it is easily possible to obtain evenly distanced scanning lines on the recording medium 6 by selecting appropriate angles for the mirror faces $5_1$–$5_5$ according to said uneven arrangement of the beams.

Furthermore, in case the laser beams have different optical path lengths, for example due to a difference in the beam position on the f-$\theta$ lens, it is still possible to correct such a difference in optical path length by adjusting the positions of the mirror faces $5_1$–$5_5$ along the incident optical axis.

Figure 5:
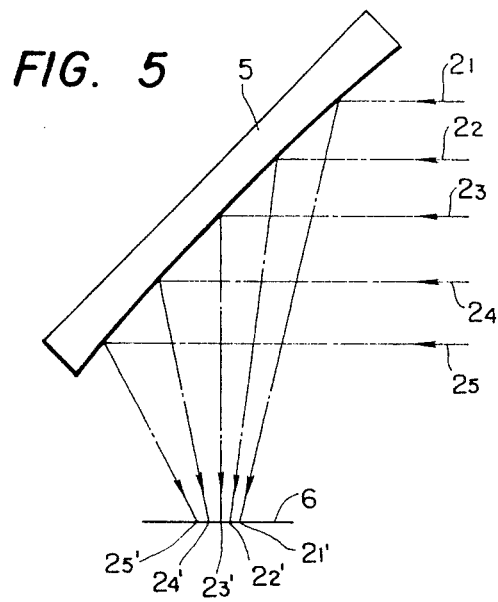

FIG. 5 shows an example of the above-mentioned mirror 5 in which the aforementioned mirror faces are merged into a concave face satisfying the aforementioned angular requirement.

Figure 6:
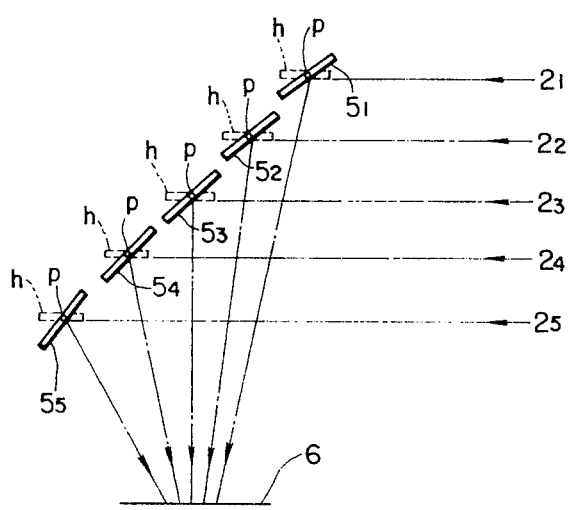

Also, FIG. 6 shows a variation of the mirror shown in FIG. 4, in which the aforementioned mirror faces $5_1$–$5_5$ are composed of independent, oblong mirrors, which are supported by unrepresented support members in such a manner that they are angularly adjustable about the axes P and slidably movable along oblong holes h in the direction of incident optical axis.

Figure 7:
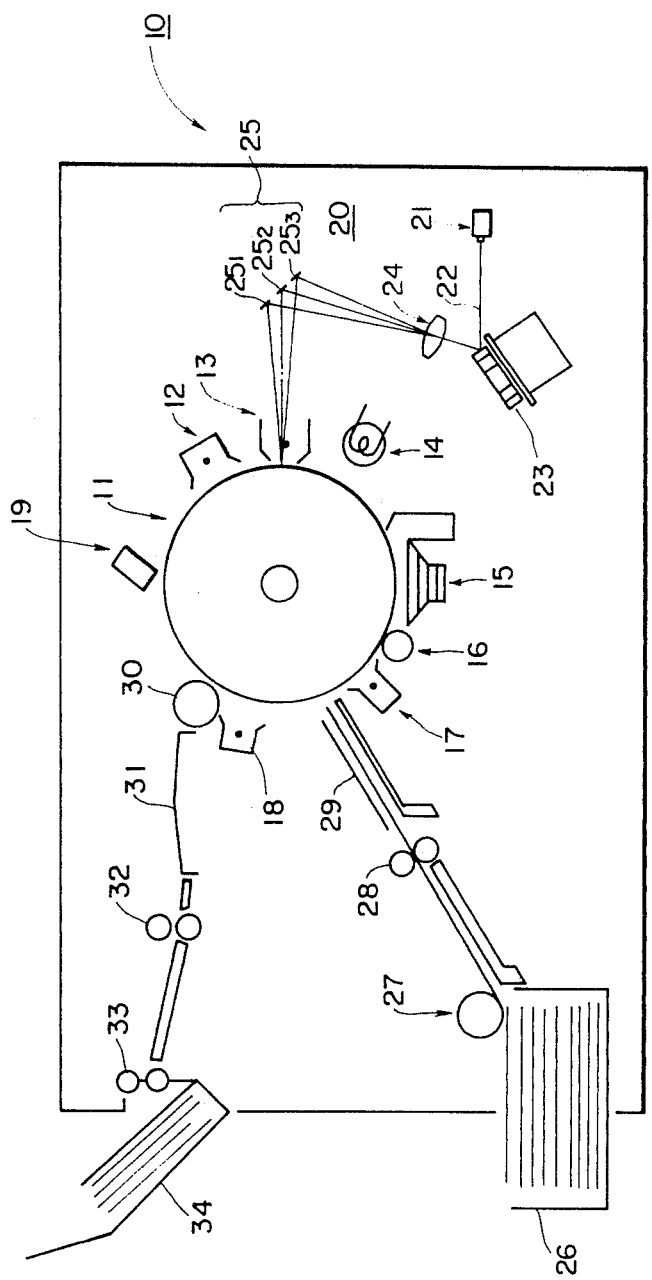
FIG. 7 is a schematic view of an image forming apparatus in which the scanning method of the present invention is applied.

FIG. 7 shows, in a lateral view, an example of the image forming apparatus employing multi-beam scanning method of the present invention, wherein said apparatus 10 employs a photosensitive drum 11 as the recording medium. Said photosensitive member is essentially composed of a conductive layer, a photoconductive layer and an insulating layer for executing an electrophotographic imaging process disclosed in the U.S. Pat. Nos. 3,666,363 and 3,734,609. Around the photosensitive drum 11 there is provided a primary corona charger 12, a secondary charger 13 optically open in the back, a flush exposure lamp 14 for latent image formation, a liquid developing unit 15 for developing the latent image, a squeeze roller 16 for squeezing the excessive liquid developer to prepare the developed image for the transfer step, and a pre-charger 17. In addition to the foregoing there is provided a transfer corona charger 18, and a cleaning device 19 comprising an elastic cleaning blade. Also, the photosensitive drum 11 is exposed to light information by means of a multi-beam scanning device 20, comprising a semiconductor laser device 21 having plural light-emitting points, from which laser beams 22 are emitted corresponding to information signals; light beam scanning means 23 utilizing a rotary polygonal mirror; optical means 24, such as a lens with f-$\theta$ characteristic, for achieving constant-speed displacement of the light beam on the recording medium in response to the constant-speed rotation of said polygonal mirror; and reflector means 25 having plural reflecting faces $25_1$, $25_2$ and $25_3$ of different angles for reducing the distance of plural laser beams.

Also, there is shown a sheet cassette 26 for feeding transfer sheets, a feed roller 27 for advancing transfer sheets, a timing roller 28, a guide member 29 for guiding the transfer sheet to the image transfer position of the photosensitive drum 11, a separating roller 30 for separating the transfer sheet, a thermal fixing unit 31, sheet transport rollers 32, 33 and a tray 34 for the transfer sheet.

The function of the above-explained apparatus will be explained in the following.

The photosensitive drum 11 is at first charged to a determined polarity by the primary corona charger 12, and is then subjected to a corona discharge containing a component of a polarity opposite to that of the primary corona discharge, i.e. a DC corona discharge of said opposite polarity, an AC corona discharge or an AC corona discharge biased to said opposite polarity, by means of the secondary corona charger 13.

Simultaneously with said secondary corona discharge, the photosensitive drum is exposed to plural light beams bearing information by the multi-beam scanning device 20. Subsequently, the photosensitive drum is uniformly illuminated by the flush exposure lamp 14 to form a latent image with development potential corresponding to that of the aforementioned scanning with light beams.

The latent image thus formed on the photosensitive drum is developed as a visible image by the liquid developing unit 15.

The excessive developer on the photosensitive drum is squeezed off by the squeeze roller 16, and a uniform charge is given to the photosensitive drum by the corona charger 17, in order to prevent distortion in the developed image and to prepare said image for the transfer step. The transfer sheet is supplied from the sheet cassette 26, advanced by the feed roller 27, and fed to the image transfer position through the timing roller 28 and the guide member 29 in synchronization with the arrival of the developed image on the photosensitive drum at said image transfer position.

In the image transfer position, the transfer sheet is overlapped on said developed image, and the transfer corona charger 18 applies a corona discharge to the rear surface of said transfer sheet to transfer said developed image onto said sheet. After said image transfer, the transfer sheet is separated from the photosensitive drum by the separating roller 30, then, is subjected to the fixation of the transferred image by the heat fixer 31, and is ejected to the tray 34 through the transport rollers 32, 33.

Also after said image transfer, the photosensitive drum is cleaned by the cleaning unit 19 for repeated use in the above-explained imaging cycle.

In this manner achieved is the high-speed image formation by multi-beam scanning.

Figure 8:
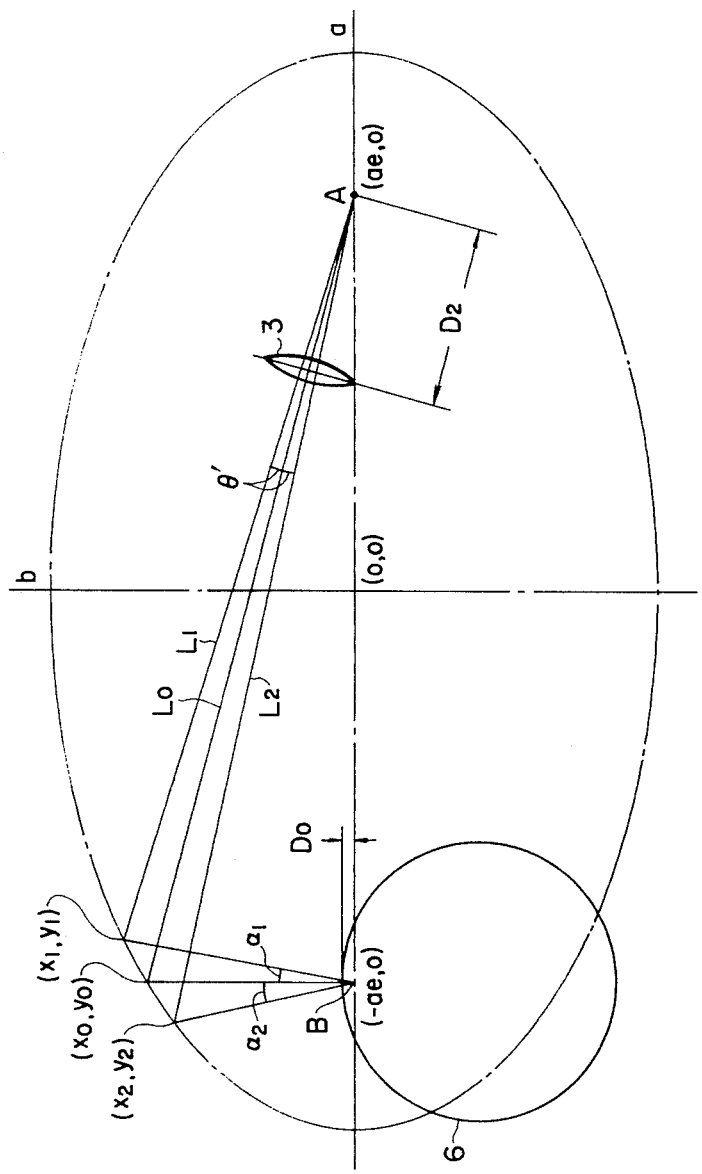
FIG. 8 is a chart showing the conditions for the scanning system employed in the apparatus of FIG. 7.

FIG. 8 shows the conditions for the reflector means employed in the multi-beam scanning device for the aforementioned image forming apparatus, in which the difference between light beam paths is exaggerated for the purpose of clarity.

The reflecting faces of said reflector means for reflecting light beams constitute an ellipse to be determined in the following manner or tangential planes thereto.

The ellipse defining said reflecting faces has a focal point A at the exit pupil of the lens means, and the other focal point B at a position slightly behind the beam focus position on the recording medium. The mutual distance of the plural beams is determined by the distance $D_0$ between said focal point B and said beam focus position. Said plural beams completely coincide when said distance $D_0$ is equal to zero, and said beams become increasingly separated with increases in said distance $D_0$. In FIG. 8 there is shown an example utilizing a lens system with a path length $D_1 = 345.4$ mm behind the lens and a distance $D_2 = 88.6$ mm to the exit pupil, wherein the ellipse has a longer diameter $a = 217.7$ mm and a shorter diameter $b \approx 150$ mm. The longer diameter $a$ is defined by $a = (D_0 + D_1 + D_2)/2$. The angle $\theta$ between the optical axis of the lens and the longer diameter is selected as 18.1°, and the aformentioned distance $D_0$ is selected as 1.4 mm. The laser device, having plural light-emitting points arranged with a pitch of 200$\mu$, emits plural beams to said lens through an unrepresented collimating lens with a focal length of 10 mm. A laser beam $L_0$ proceeding along the optical axis of the lens system is reflected by a reflecting face on said ellipse and is guided to the recording medium in a direction parallel to the shorter diameter of the ellipse, i.e. perpendicular to the longer diameter thereof. Neighboring laser beams $L_1$ and $L_2$ are inclined by an angle $\theta' \approx 0.7°$ to the lens axis at the exit pupil of the lens system, thus forming angles $\theta + \theta'$ and $\theta - \theta'$, respectively, to the longer diameter of the ellipse. Said laser beams are reflected by the reflecting faces along the ellipse and are guided to the focal point B. The reflected beams $L_1$ and $L_2$ form angles $\alpha_1 \approx 2.5°$ and $\alpha_2 \approx 2.6°$, respectively, to a direction perpendicular to the longer diameter at said focal point B. A slight difference between said angles is negligible in practice. The above-mentioned example enables scanning with 16 scanning lines per millimeter. As explained in the foregoing, said distance $D_1$ can be decreased for obtaining a further reduced pitch of the scanning lines or increased for obtaining a less dense scanning pitch, for example 8 lines per millimeter.

In the foregoing example, the lens system has the exit pupil at a finite distance to compact the optical system. On the other hand, in case of a telecentric lens having the exit pupil at the infinite distance as already explained with respect to FIG. 1, the emergent beams become mutually parallel. If other conditions of the lens system are selected the same as mentioned above, the reflecting faces are arranged along a parabola obtained by shifting the aforementioned focal point A to the infinite distance. Consequently, in case the beams are mutually parallel as shown in FIGS. 4, 5 and 6, the reflecting faces are arranged along a certain parabola.

Referring to FIG. 9 there is shown an example of the control circuit for the aforementioned multi-beam scanning device, in which two light-emitting points 35, 36 are controlled by laser drive circuits 37, 38. Said control circuit is provided with about the same two control units 39 and 40, one of which drives the laser through the laser drive circuit while the other reads the video signals in an alternating manner for each scanning period, as will be explained later.

In said control circuit there is shown an input terminal $In_1$ for receiving video signals Sv bearing information an input terminal $In_2$ for receiving clock signals Sc; read/write timing pulse generators 41, 42 for controlling the timing of writing or reading the input video signals into or from memories; memories 43, 44, 45, 46 each having a capacity for storing information of one line; preset counters 47, 48; flip-flops 49, 50 for switching the memories; flip-flops 51, 52 for generating clock switching signals; latch circuits 53, 54, 55, 56 for latching the signals read from the memories for supply to the laser drive circuits 37, 38; and a frequency divider 57 for dividing the clock signals.

The function of the above-explained control circuit will be explained in the following.

Explained initially, is a state in which the first control unit 39 stores the video signals while the second control unit 40 drives the laser. The first control unit 39 selects the ordinary clock frequency in response to the first clock switching signal corresponding to the state of the flip-flop 51. The read/write timing pulse generator 41 supplies the write pulses S(w) to the memories 43, 45 in response to said clock switching signal. During the clock counting time by the present counter 47 for the first line, the flip-flop 49 supplies selection signals S(CH) to the first memory 43 and to the second memory 45, thus storing the video signals for the N-th line into the first memory 43. Upon completion of the counting of said preset counter 47 for one line, a corresponding end signal shifts the state of said flip-flop 49, whereby the selection signal S(CH) is supplied to the second memory 45 to store the video signals for the (N+1)-th line therein.

Simultaneous with the above-mentioned function of the first control unit 39, the second control unit 40 performs the following functions according to the information for the (N−2)-th line and the (N−1)-th line stored in the third memory 44 and the fourth memory 46, respectively.

Said second control unit 40 selects, in response to a second clock switching signal according to the state of the flip-flop 52, the clock signals from the frequency divider, having a frequency equal to a half of the ordinary clock frequency. The read/write timing pulse generator 42 supplies read pulses S(R) to the memories 44, 46 in response to said second clock switching signal. Also the output terminal of said flip-flop 52 is connected to the memories 44, 46 through an OR gate to which the output terminal of the flip-flop 50 is also connected, and the simultaneous functions of the memories 44, 46 are maintained by the output of said flip-flop 52 in this state. On the other hand, the preset counter 48 counts said frequency-divided clock signals, and the signals are simultaneously read from the memories 44, 46 corresponding to the state of said counting. The signals for the (N−2)-th line read from the memory 44 are supplied to the laser drive circuit 37 through the latch circuit 54, while the signals for the (N−1)-th line read from the memory 46 are supplied to the laser drive circuit 38 through the latch circuit 56.

In this manner the lasers 35 and 36 are modulated by the signals for the (N−2)-th and (N−1)-th lines, respectively.

Upon completion of the counting by the preset counter 48 for a scanning cycle, a line end signal is generated to shift the state of the flip-flop 52, whereby the second control unit 40 is shifted from the laser driving state to the aforementioned state of video signal storage previously executed by the first control unit.

In the first control unit 39, upon completion of the storage of the signals for the (N+1)-th line in the second memory 45, the preset counter 47 generates a line end signal to shift the state of the flip-flop 51, whereby the first control unit 39 is shifted to the laser driving state utilizing the signals for the N-th and (N+1)-th lines stored in the first memory 43 and the second memory 45, respectively.

As explained in the foregoing, the recording can be achieved through an extremely simple control since the beam-controlling signals are given as continuous signals for a line. Also the timing control is quite easy as the recording of different beam lines is started or terminated at a same time.

Although the aforementioned control circuit is designed for controlling two light beams, it is naturally possible to control a desired number of beams by increasing the number of memories corresponding to said number of beams.

What I claim is:

1. An image forming apparatus for scanning a recording medium by plural light beams, comprising:
   beam generating means for generating plural light beams;
   scanning means for scanning with said plural light beams;
   optical means for achieving a constant-speed scanning with said plural light beams on the recording medium; and
   reflective optical means for reducing the distance between said plurality light beams on the recording medium, said plural light beams being disposed in a direction perpendicular to the direction of beam scanning on the recording medium.

2. An image forming apparatus for scanning a recording medium by plural light beams, comprising:
   beam generating means for generating plural light beams;
   scanning means for scanning with said plural light beams;
   optical beams for achieving constant-speed scanning with said plural light beams on the recording medium; and
   reflective optical means for reducing the distance between said plurality light beams on the recording medium, wherein areas of said reflective optical means for scanning said light beams correspond to tangential planes of a determined ellipse.

3. An image forming apparatus according to claim 2 wherein one of the focal points of said ellipse is positioned at the exit pupil of a lens in said constant-speed scanning means.

4. An image forming apparatus according to claim 3, wherein the other of the focal points of said ellipse is positioned at a set distance from the imaging position on the recording medium.

5. An image forming apparatus for scanning a recording medium by plural light beams, comprising:
   beam generating means for generating plural light beams;
   scanning means for scanning with said plural light beams;
   optical means for achieving constant-speed scanning with said plural light beams on the recording medium; and
   reflective optical means for reducing the distance between said plural light beams on the recording medium, wherein areas of said reflective optical means for scanning said light beams correspond to tangential planes of a determined parabola.

6. An image forming apparatus according to claim 5, wherein said scanning means includes a lens having an exit pupil at an infinite distance.

7. An image forming apparatus according to claim 6, wherein the focal point of said parabola is positioned at a set distance from the imaging position of the recording medium.

8. An image forming apparatus according to any one of claims 2 to 7, wherein said scanning means includes a light deflecting member supported on a rotary axis; and said beam generating means includes a laser device having plural light beam emitting points arranged at a determined pitch and along a direction parallel to the rotary axis of said light deflecting member.

9. An image forming apparatus according to claim 8, further comprising control means for controlling the light beam emission from said laser device in response to information signals.

10. An image forming apparatus according to claim 9, wherein said control means is adapted to control said plural light beam emitting points.

11. An image forming apparatus for scanning a recording medium with plural light beams, comprising:
    beam generating means for generating plural light beams;
    scanning means for scanning with said plural light beams; and
    optical means for reducing the distance between said plural light beams on the recording medium, said optical means including plural planar reflecting areas, each area receiving one of said plural light beams and having a different angle.

12. An image forming apparatus for scanning a recording medium with plural light beams, comprising:
    beam generating means for generating plural light beams;
    scanning means for scanning with said plural light beams; and
    optical means for reducing the distance between said plural light beams on the recording medium, said optical means including a concave curved reflecting surface in which each tangential plane at the position for receiving one of said light beams, has a different angle.

13. An image forming apparatus according to claim 12, wherein said scanning means includes a light deflecting member supported on a rotary axis, and said beam generating means includes a laser device having plural light beam emitting points arranged at a determined pitch and along a direction parallel to the rotary axis of said light deflecting member.

14. An image forming apparatus for scanning a recording medium with plural light beams, comprising:
    beam generating means for generating plural light beams;
    scanning means for scanning with said plural light beams; and
    optical means for reducing the distance between said plural light beams on the recording medium, said optical means including plural planar refelecting areas, each are receiving one of said plural light beams and having a different angle, wherein said scanning means includes a light deflecting member supported on a rotary axis, and said beam generating means includes a laser device having plural light beam emitting points arranged at a determined pitch and along a direction parallel to the rotary axis of said light deflecting member.

15. An image forming apparatus according to claim 14, wherein each of said plural planar reflecting areas are angularly adjustable.

16. An image forming apparatus for scanning a recording medium by plural light beams, comprising:
    beam generating means for generating plural light beams;
    scanning means for scanning with said plural light beams;
    optical means for reducing the distance of said plural light beams on the recording medium, said optical means including plural planar reflecting areas, each area being adapted for receiving one of said plural light beams and being provided with a different angle; and
    control means for controlling each light beam generation from said generating means in response to information signals.

17. An image forming apparatus according to the claim 16, wherein each of said plural planar reflecting areas are angularly adjustable.

18. An image forming apparatus for scanning a recording medium by plural light beams, comprising:
    beam generating means for generating plural light beams;
    scanning means for scanning with said plural light beams;
    optical means for reducing the distance between said plural light beams on the recording medium, said optical means including a concave curved reflecting surface in which each tangential plane at the point for receiving one of said plural light beams, has a different angle; and
    control means for controlling each light beam generation from said beam generating means in response to information signals.

19. An image forming apparatus according to any one of claims 16 or 18, wherein said scanning means includes a light deflecting member supported on a rotary axis, said beam generating means includes a laser device having plural light beam emitting points arranged at a determined pitch and along a direction parallel to the rotary axis of said light deflecting member, and said control means is adapted to control the beam emission from each light beam emitting point of said laser device.

20. An image forming apparatus according to the claim 14, wherein said control means is adapted to control each light beam emitting point in response to mutually continuous information signals.

21. An image forming apparatus according to the claim 20, wherein said control means is adapted to control said plural light beam emitting points.

* * * * *

UNITED STATES PATENT AND TRADEMARK OFFICE
CERTIFICATE OF CORRECTION

PATENT NO. : 4,445,126

DATED : April 24, 1984

INVENTOR(S) : MASAHARU TSUKADA

It is certified that error appears in the above-identified patent and that said Letters Patent is hereby corrected as shown below:

Column 2

Delete ",", first occurrence.

Column 4

Line 48, change "length" to --lengths--.

Column 6

Line 3, before "then" insert --and--.

Line 10, between "manner" and "achieved" insert --there is--, and delete "is the".

Line 34, change "$\approx$" to -- $\doteq$ --.

Line 48, change "$\approx$" to -- $\doteq$ --.

Line 53, change "$\approx$", both occurrences, to -- $\doteq$ --.

Column 7

Lines 17-18, after "information" insert --;--.

UNITED STATES PATENT AND TRADEMARK OFFICE
CERTIFICATE OF CORRECTION

PATENT NO. : 4,445,126
DATED : April 24, 1984
INVENTOR(S) : MASAHARU TSUKADA

Page 2 of 2

It is certified that error appears in the above-identified patent and that said Letters Patent is hereby corrected as shown below:

<u>Column 8 (Claim 2)</u>

Line 57, change "beams" to --means--.

Line 61, change "plurality" to --plural--.

<u>Column 8 (Claim 3)</u>

Line 65, after "claim 2" insert --,--.

<u>Column 10 (Claim 14)</u>

Line 9, change "refelecting" to --reflecting--.

<u>Column 10 (Claim 20)</u>

Line 62, change "14" to --19--.

Signed and Sealed this

Thirteenth Day of November 1984

[SEAL]

Attest:

*Attesting Officer*

GERALD J. MOSSINGHOFF
*Commissioner of Patents and Trademarks*